United States Patent [19]

Kiovsky et al.

[11] 3,979,373

[45] Sept. 7, 1976

[54] POLYMERIC FURAN DERIVATIVE

[75] Inventors: Thomas E. Kiovsky; Richard C. Kromer, both of Houston, Tex.

[73] Assignee: Shell Oil Company, Houston, Tex.

[22] Filed: June 13, 1975

[21] Appl. No.: 587,001

[52] U.S. Cl. .............................. 526/12; 260/63 CQ; 526/11.1; 526/30; 526/41; 526/42; 526/46
[51] Int. Cl.² ................. C08F 110/02; C08G 2/00; C08G 4/00
[58] Field of Search .............. 260/94.9 R, 94.9 GD, 260/63 CQ, 88.1 R, 91.9 GB

[56] References Cited
UNITED STATES PATENTS

| | | |
|---|---|---|
| 2,495,286 | 1/1950 | Brubaker ..................... 260/63 CQ |
| 3,068,201 | 12/1962 | Michel ........................ 260/63 CQ |
| 3,689,460 | 9/1972 | Nozaki ........................ 260/63 CQ |
| 3,694,412 | 9/1972 | Nozaki ........................ 260/63 CQ |
| 3,835,123 | 9/1974 | Nozaki ........................ 260/63 CQ |

*Primary Examiner*—Joseph L. Schofer
*Assistant Examiner*—Herbert J. Lilling

[57] ABSTRACT

A thermoplastic polymer composition and the method for making the same are disclosed. The polymer composition comprises randomly distributed units of

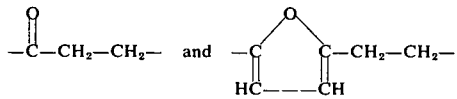

and
in specified ratios. The process for producing the polymer comprises reacting a polyketone with a strong acid wherein the polyketone is the equimolar alternate copolymer of ethylene and carbon monoxide.

7 Claims, No Drawings

POLYMERIC FURAN DERIVATIVE

THE PRIOR ART

Interpolymers of carbon monoxide and ethylene (polyketones), as well as processes for their preparation are well known. The first polyketones were disclosed by Farbenfabriken Bayer in 1941, German Patent No. 863,771. Significant classes of polyketones which have been prepared include: (1) high molecular weight copolymers which are essentially polyethylene with less than 1% CO incorporated, prepared via Ziegler catalysis (British Patent No. 925,130); (2) free radical and radiation initiated copolymers which have low molecular weight and a CO content varying up to 50% (W. G. Barb, Journal of the American Chemical Society, 75 224 (1953), P. P. Colombo et al, Journal of Polymer Science B1, 447 (1963)); and (3) transition metal catalyzed copolymers with an apparent regular alternating-chain structure. Processes to prepare these alternating-chain structure polyketones are disclosed in U.S. Pat. No. 2,577,208 [$K_2Ni(CN)_4$ catalyst], British Pat. No. 1,081,304 [$(Bu_3P)_2Pd(Cl)_2$ catalyst], and U.S. 3,835,123 [$HPd(CN)_3$ catalyst].

The transition metal-catalyzed polyketones with an alternating-chain structure are particularly desirable polymers because of the low cost of the reactants (carbon monoxide and ethylene) employed and because of their potential use as premium thermoplastics. However, some of the present high molecular weight equimolar alternating copolymers of ethylene and carbon monoxide can not be processed by the usual extrusion methods without destroying some of the thermoplastic properties. In particular, when an equimolar alternating copolymer of ethylene and carbon monoxide having a molecular weight of about 300,000 daltons and a melting point of about 250°C prepared using a quaternary ammonium tetracyanonickelate catalyst and a hexafluoroisopropanol solvent is pressed to a film at or above its melting point, decomposition, characterized by loss of water and discoloration, occurs. These same polyketones undergo significant crosslinking when heated for as little as four minutes at temperatures of 20° to 30°C below their melting point. One method to improve the processability of the polyketone is disclosed in our copending application, Polymeric Pyrrollic Derivative, Ser. No. 587,198, Filed 6-13-75, 1975, wherein a polyketone is reacted with a primary monoamine forming a polymer with randomly distributed ketone and pyrrollic groups. Another method is disclosed in our copending application, Polyketone Derivative, Ser. No. 587,199, Filed 6-13-75, 1975 wherein a polyketone is reacted with a thiol compound forming a polymer with randomly distributed ketone and thioketal groups. A new derivative of a polyketone, suitable as a thermoplastic, has now been found.

SUMMARY OF THE INVENTION

The present invention discloses a thermoplastic polymer composition and the method for making the same, which composition comprises randomly distributed units of

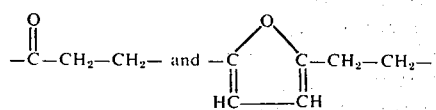

in specified ratios.

DETAILED DESCRIPTION OF THE INVENTION

The Polymer Composition

The thermoplastic polymer disclosed is characterized by random distribution along the polymer chain of $n$ units of

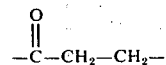

and $m$ units of

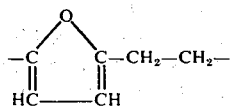

where $n$ and $m$ are both integers, $n$ has a value of from about 150 to about 10,000, and the ratio of $m$ to $n$ varies from about 2:100 to about 25:100. Preferably $n$ has a value of from about 600 to about 8000, most preferably from about 800 to about 2500.

The polymer disclosed retains most of the favorable characteristics of the unmodified polyketone and in addition has a lower melting point than the unmodified polyketone thereby permitting the extrusion forming of thermoplastic products without significant crosslinking and decomposition. One means to control the melting point and other properties of the polymer is to vary the ratio of

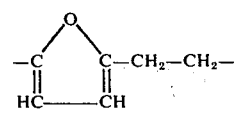

groups to

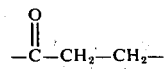

groups, that is the ratio of $m$ to $n$. The ratio of $m$ to $n$ preferably varies from about 3:100 to about 20:100 and most preferably from about 5:100 to 10:100. When the ratio of $m$ to $n$ equals about 1:6, typically the polymer no longer has a crystalline structure. Thus, ratios of $m$ to $n$ exceeding about 1:6 are unnecessary to reduce crystallinity in the polymer. However, when the ratio of $m$ to $n$ is less than about 2:100 the melting point of the polymer is not sufficiently reduced, and accordingly, when the polymer is extruded at or above its melting point it crosslinks and partially decomposes as evidenced by discoloration and water loss. Preferably, the melting point of the modified polyketone is between about 180°C and about 230°C, most preferably between about 190°C and about 220°C.

Process for Making the Polymer

Also of importance is the process for making the polymer which comprises reacting a polyketone with a strong acid wherein:

a. the polyketone is the equimolar alternating copolymer of ethylene and carbon monoxide having the generalized formula

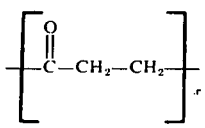

where $x$ has a value of from about 150 to about 10,000, and b. the ratio of the moles of strong acid to $x$ varies from about 1:100 to about 20:100.

The polyketone employed is prepared by any suitable catalyst system that results in an equimolar, alternating copolymer, e.g., a complex tetracyanonickelate catalyst and a hexafluoroisopropanol solvent. Other suitable catalysts are the palladium catalysts as stated above. Preferably $x$ has a value of from about 600 to about 8,000, corresponding to a molecular weight of from about 35,000 daltons to about 400,000 daltons. Most preferably, $x$ varies from about 800 to about 2,500, corresponding to a molecular weight of from about 50,000 daltons to about 140,000 daltons. The melting point of the polyketone is typically between about 240°C and about 260°C.

The strong acid employed to form the furan group must have a certain acidity (acid strength) and the concentration of the acid must be within a certain range. The strength of an acid HA is expressed as the negative log to the base 10 of the equilibrium constant K in water at 25°C. Therefore, in the disassociation of the acid HA where the brackets [ ] signify molar concentration, the equilibrium constant K of an acid is defined as follows:

$$K = \frac{[H^+][A^-]}{[HA]}$$

The stronger the acid the lower the $pK_a$. The $pK_a$ of the strong acid used in this invention must be below about 2.5, preferably about −3.0 to about 2.0. Examples of suitable strong acids include sulfuric acid, phosphoric acid, para-toluenesulfonic acid, trifluoroacetic acid, trifluoromethane-sulfonic acid, and para-phenolsulfonic acids. The preferred strong acids are sulfuric acid, trifluoroacetic acid and para-toluenesulfonic acid.

By varying the temperature, reaction time and molar ratio of strong acid to polyketone, it is possible to control the number of furan groups formed, that is, it is possible to control the number of

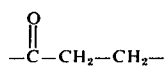

units as compared to the number of

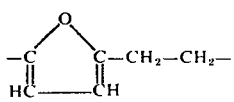

units. The reaction is exemplified in the formula below:

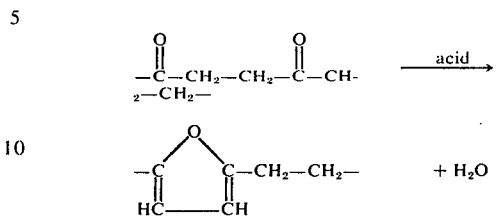

The molar ratio of strong acid to each equivalent of polyketone varies from about 1:100 to about 20:100. An equivalent of polyketone is defined as a $$-\overset{O}{\underset{\|}{C}}-CH_2-CH_2-$$

unit. Preferably the molar ratio of strong acid to each equivalent of polyketone varies from about 1:100 to about 10:100, most preferably from about 1:100 to about 8:100.

The polyketone and strong acid are preferably contacted in the presence of a solvent. The solvents employed are m-cresol and hexafluoroisopropanol. The amount of solvent employed is not critical. Preferred amounts vary from about 99% weight to about 80% weight based on the weight of the resulting solution. Optionally, a compound such as magnesium sulfate is added to the reaction mixture to absorb the water generated in the condensation reaction, thereby improving the reaction equilibrium. The typical amount of absorbent, when added, varies from about 1% weight to about 5% weight based on the combined weight of the polyketone and solvent.

The polyketone and strong acid are contacted in any suitable manner. In one embodiment the polyketone is first dissolved in the solvent. Then the strong acid and optional absorbent are added to the mixture. The resulting mixture is then heated. Reaction temperatures vary from about 40°C to about 200°C, preferably from about 70°C to about 150°C. Reaction pressure may be atmospheric, sub-atmospheric or super-atmospheric. The contact time varies from about 10 minutes to about 3 hours, preferably about one hour. The polymer is separated from the reaction mixture by various procedures, for example, by distillation or by selective crystallization. In a preferred procedure methanol is added to the reaction mixture thereby precipitating the polymer. Water is also employed to precipitate the polymer. The polymer is then removed, e.g. by a centifuge, filtered, and dried.

The polymers prepared according to this invention are useful as thermoplastic materials. Typically the polymer is extruded to form materials for use as automobile trim molding or for other decorative uses. Further, other materials are typically added to the polymer such as plasticizers, extenders and fillers. These other materials include, for example, glycerol, 1-4 butanediol, glass fiber and carbon black.

The invention is further illustrated by means of the following Illustrative Embodiment. Note that the embodiment is given for the purpose of illustration only and that the invention is not to be regarded as limited to any of the specific conditions or reactants recited therein.

In the embodiment, the polyketone employed was an equimolar alternating copolymer of ethylene and carbon monoxide of the general formula

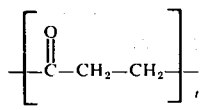

where $t$ is an integer having a value of about 5,000 commensurate with a total molecular weight of about 300,000 daltons. The polyketone was prepared with a quarternary ammonium tetracyanonickelate catalyst and a hexafluoroisopropanol (HFIP) solvent. Most of the catalyst was removed from the resulting polyketone leaving a nickel content for the polyketone of about 8 ppmw. The melting point of the polyketone was about 250°C and the swelling ratio was about 70. The "swelling ratio" is a measure of the crosslinking of a pressed film of the thermoplastic polymer examined. Swelling ratio is determined by cutting a disc from the pressed plastic film after heating at 215°C for 15 minutes and measuring the increase in weight after soaking the film in HFIP for 24 hours at ambient temperature. Swelling ratio is thus the weight of the swollen sample divided by the weight of the original disc. The higher the swelling ratio the less extensive is the crosslinking.

ILLUSTRATIVE EMBODIMENT I

Illustrative Embodiment I details the procedure involved in preparing the furan derivative of polyketone. To a solution of 2.5 grams (g) polyketone (0.04 moles of repeating units

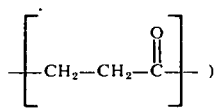

in 100 milliliters (ml) meta-cresol was added a solution of 0.05 g concentrated sulfuric acid (0.005 moles) in 20 ml meta-cresol. The resulting solution was heated at 100°C for one hour, then cooled and mixed with an equal volume of methanol. The precipitated polymer was subsequently washed with an additional quantity of methanol. Upon filtering and drying, the polymer obtained had a melting point of 196°C as measured by differential scanning calorimetry. A $^{13}$C-NMR spectrum of the polymer indicated the presence of furan rings at a concentration of 8 furan groups per 100 carbonyl groups. The results of this embodiment is shown as Run Number 1 in Table I.

In a procedure similiar to that employed in Run Number 1, other furan derivatives were prepared. In runs 1 through 4 the solvent employed was hexafluoroisopropanol while in runs 5 through 13 the solvent employed was meta-cresol. The two acids employed were concentrated sulfuric acid ($H_2SO_4$) and trifluoroacetic acid (TFA). In runs 1–7 the pressure was atmospheric while in runs 8–13 the pressure was superatmospheric since the reaction temperature was above the boiling point of the solvent. Results are presented as Run Numbers 2 through 13 in Table I.

TABLE I

| Run No. | Polyketone, g | Solvent ml | Acid Type | Acid Amount g | Reaction Temperature °C | Reaction Time Min. | Polymer Product Melting Point °C |
|---|---|---|---|---|---|---|---|
| 1 | 2.0 | 100 | $H_2SO_4$ | 0.05 | 100 | 60 | 196 |
| 2 | 20.0 | 400 | $H_2SO_4$ | 0.36 | 100 | 60 | 202 |
| 3 | 2.5 | 100 | $H_2SO_4$ | 0.05 | 200 | 60 | Amorphous |
| 4 | 2.8 | 100 | $H_2SO_4$ | 0.05 | 100 | 80 | 170 |
| 5 | 2.0 | 50 | TFA | 0.01 | 58 | 60 | 244 |
| 6 | 2.0 | 50 | TFA | 0.01 | 58 | 120 | 216 |
| 7 | 2.5 | 50 | $H_2SO_4$ | 0.1 | 20 | 10 | 242 |
| 8 | 2.5 | 50 | $H_2SO_4$ | 0.1 | 100 | 60 | 220 |
| 9 | 2.5 | 50 | TFA | 0.1 | 70 | 60 | 244 |
| 10 | 3.6 | 50 | TFA | 0.5 | 100 | 60 | 250 |
| 11 | 3.6 | 50 | TFA | 0.5 | 135 | 60 | 235 |
| 12 | 3.6 | 50 | TFA | 0.5 | 155 | 60 | 218 |
| 13 | 110.0 | 2200 | TFA | 14.0 | 150 | 60 | 218 |

We claim as our invention:

1. The thermoplastic polymer characterized by random distribution along the polymer chain of $n$ units of

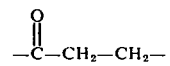

and $m$ units of

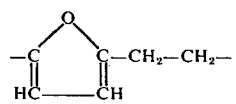

wherein $n$ and $m$ are both integers, $n$ has a value of from about 150 to about 10,000, and the ratio of $m$ to $n$ varies from about 2:100 to about 25:100.

2. The polymer of claim 1 wherein $n$ has a value of from about 600 to about 8,000 and the ratio of $m$ to $n$ varies from about 3:100 to about 20:100.

3. The process for making a thermoplastic polymer which comprises reacting a polyketone with a strong acid at a temperature of between about 40°C and about 200°C for between about 10 minutes and about 3 hours wherein:

a. said polyketone in the equimolar alternating copolymer of ethylene and carbon monoxide having the formula

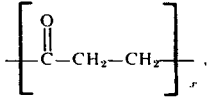

where $x$ has a value of from about 150 to about 10,000; and b. the ratio of the moles of strong acid to $x$ varies from about 1:100 to about 10:100.

4. The process according to claim 3 wherein said strong acid is an acid having a p$K_a$ of between about −3.0 and about 2.5.

5. The process according to claim 3 wherein said strong acid is selected from the group consisting of sulfuric acid, phosphoric acid, para-toluenesulfonic acid, trifluoroacetic acid, trifluoromethane-sulfonic acid, and para-phenolsulfonic acid.

6. The process according to claim 3 wherein said strong acid is selected from the group consisting of sulfuric acid, trifluoroacetic acid, and para-toluenesulfonic acid.

7. The process according to claim 3 wherein said polyketone and said strong acid are contacted in the presence of a solvent selected from the group consisting of hexafluoroisopropanol and meta-cresol.

* * * * *